United States Patent
Fukuda

(10) Patent No.: US 12,086,223 B2
(45) Date of Patent: Sep. 10, 2024

(54) LINEAR SKETCH SYSTEM, APPARATUS, AUTHENTICATION METHOD, PROGRAM, AND RECORDING MEDIUM

(71) Applicant: NEC Corporation, Tokyo (JP)

(72) Inventor: Haruna Fukuda, Tokyo (JP)

(73) Assignee: NEC CORPORATION, Tokyo (JP)

(*) Notice: Subject to any disclaimer, the term of this patent is extended or adjusted under 35 U.S.C. 154(b) by 382 days.

(21) Appl. No.: 17/432,974

(22) PCT Filed: Feb. 25, 2019

(86) PCT No.: PCT/JP2019/006971
§ 371 (c)(1),
(2) Date: Aug. 23, 2021

(87) PCT Pub. No.: WO2020/174516
PCT Pub. Date: Sep. 3, 2020

(65) Prior Publication Data
US 2022/0171835 A1    Jun. 2, 2022

(51) Int. Cl.
*G06F 21/32* (2013.01)

(52) U.S. Cl.
CPC .................. *G06F 21/32* (2013.01)

(58) Field of Classification Search
CPC ........................................................ G06F 21/32
See application file for complete search history.

(56) References Cited

U.S. PATENT DOCUMENTS

| | | | |
|---|---|---|---|
| 2003/0219121 A1* | 11/2003 | van Someren | G07C 9/37 713/186 |
| 2008/0072063 A1* | 3/2008 | Takahashi | H04L 9/3231 713/186 |
| 2015/0195090 A1 | 7/2015 | Obana et al. | |
| 2015/0248458 A1* | 9/2015 | Sakamoto | G06F 16/137 707/719 |
| 2015/0341350 A1 | 11/2015 | Mandal et al. | |
| 2016/0080142 A1 | 3/2016 | Isshiki et al. | |
| 2016/0094348 A1* | 3/2016 | Takahashi | H04L 9/3231 713/176 |

(Continued)

FOREIGN PATENT DOCUMENTS

| JP | 2017-195567 A * | 7/2008 |
|---|---|---|
| JP | 5707311 B2 | 4/2015 |

(Continued)

OTHER PUBLICATIONS

NPL History Search (Year: 2023).*
Takahasi, Signature Schemes with a Fuzzy Private Key (Year: 2016).*
Dodis, Fuzzy Extractors, How to Generate Strong Keys from Biometrics and Other Noisy Data (Year: 2008).*

(Continued)

*Primary Examiner* — Samson B Lemma
*Assistant Examiner* — Richard W Cruz-Franqui

(57) ABSTRACT

A generation apparatus converts a received key to an encoded key by using an encoding function of an error correcting code, and generates a sketch by applying a first composite transformation on received fuzzy data and the encoded key. A reconstruction apparatus receives a first sketch and a second sketch, generates a composite sketch by applying second composite transformation on the first and second sketches, and reconstruction calculates difference between the two keys used to generate the first and second sketches based on the composite sketch.

16 Claims, 10 Drawing Sheets

(56) References Cited

U.S. PATENT DOCUMENTS

| | | | |
|---|---|---|---|
| 2016/0094974 A1* | 3/2016 | Muttik | G06F 21/35 |
| | | | 370/254 |
| 2016/0119143 A1 | 4/2016 | Fang et al. | |
| 2019/0042716 A1* | 2/2019 | Kaga | H04L 9/3231 |
| 2019/0190702 A1 | 6/2019 | Isshiki et al. | |
| 2020/0014540 A1* | 1/2020 | Kaga | G06V 40/1365 |
| 2022/0103375 A1* | 3/2022 | El Kaafarani | H04L 9/14 |
| 2022/0171835 A1* | 6/2022 | Fukuda | H04L 9/32 |
| 2023/0327884 A1* | 10/2023 | Verheul | H04L 9/0866 |
| | | | 713/168 |

FOREIGN PATENT DOCUMENTS

| | | | |
|---|---|---|---|
| JP | 2015-226323 A | | 12/2015 |
| JP | 2010-034967 A | * | 4/2016 |
| JP | 2016-533694 A | | 10/2016 |
| JP | 6096893 B2 | | 3/2017 |
| JP | 6216567 B2 | | 10/2017 |
| WO | 2014/010725 A1 | | 1/2014 |
| WO | 2014/050952 A1 | | 4/2014 |
| WO | 2014/175320 A1 | | 10/2014 |
| WO | 2014/192086 A1 | | 12/2014 |
| WO | 2018/043466 A1 | | 3/2018 |

OTHER PUBLICATIONS

Bringer, Theoretical and Practical Boundaries of Binary Secure Sketches (Year: 2008).*
Bringer, Optimal Iris Fuzzy Sketches (Year: 2007).*
Li, Fuzzy Extractors for Biometric Identification (Year: 2017).*
NPL Search History (Year: 2024).*
International Search Report for PCT Application No. PCT/JP2019/006971, mailed on May 28, 2019.
Takahashi Kenta et al., "A Signature Scheme with a Fuzzy Private Key", Springer International Publishing Switzerland 2015, T. Malkin et al. (Eds.):ACNS 2015, LNCS 9092, pp. 105-126. 2015.
Matsuda Takahiro et al., "Fuzzy Signatures: Relaxing Requirements and a New Construction", Springer International Publishing Switzerland 2016, M. Manulis et al. (Eds.):ACNS 2016, LNCS 9696, pp. 97-116, 2016.
Hidano Seira et al., "Evaluation of Security for Protected Template in Biometric Cryptosystem Using Fuzzy Commitment Scheme", 2013 Information Processing Society of Japan, Received on Oct. 21, 2012, vol. 54, No. 11, 2383-2391 (Nov. 2013).
Takahashi Kenta et al., "Signature Schemes with a Fuzzy private Key", Cryptology ePrint Archive, Report 2017/1188, [online], Apr. 2, 2018, pp. 1-51, [retrieved on May 17, 2019], retrieved from the Internet:<URL:https://eprint.iacr.org/2017/1188>.

* cited by examiner

LINEAR SKETCH SYSTEM, APPARATUS, AUTHENTICATION METHOD, PROGRAM, AND RECORDING MEDIUM

This application is a National Stage Entry of PCT/JP2019/006971 filed on Feb. 25, 2019, the contents of all of which are incorporated herein by reference, in their entirety.

TECHNICAL FIELD

The present invention relates to a linear sketch system, authentication method, program, and recording medium.

BACKGROUND

Personal authentication is a means to confirm identity between a registered person and a person to be authenticated, which is performed by comparing information about a registered person stored in advance, with information about a person to be authenticated obtained for each authentication performed.

In biometric authentication, for example, a physical feature or the like such as face, fingerprint, and iris is used for authentication. More specifically, data called a feature value is extracted from a living body and used for authentication. A feature value extracted from a living body differs slightly for each extraction. Therefore, when authentication is executed, the feature value extracted from a registered person and a feature value extracted from a person to be authenticated are compared, and when they are is found to be information close enough, the authentication is successful.

Compared with authentication performed by what is memorized by a user such as a password, or what is possessed by a user such as an IC (Integrated Circuit) card, biometric authentication has an advantage of higher convenience because the biometric authentication does not require active preparation by a user, such as memorizing a password or possessing an IC card to enter authentication information. Further, biometric authentication, since authentication information thereof is difficult to be used by other people, has an advantage of high security.

With advancement in a technology such as a feature value extraction method, biometric authentication has been increasingly used as a means of personal authentication in recent years.

On the other hand, the biometric authentication has a disadvantage in that biometric information, which is invariant throughout life, cannot be changed when it is leaked.

Hence, biometric authentication schemes that can store biometric information in a secret manner and determine an authentication result with the biometric information kept secret is being actively researched.

Furthermore, in order to take advantage of merits of the biometric authentication, a method is desirable that does not require a user of anything other than biometric information such as memorization or possession.

One of such biometric authentication techniques is a fuzzy signature, which is disclosed in NPL (Non-Patent Literature) 1 and so forth. The fuzzy signature is executed by a client and a server as follows.

At a time of registration: A client generates a template from biometric information entered by a user and sends the template to a server. The server stores the template received from the client.

At a time of authentication: The client generates a signature from the biometric information entered by the user and a message received from the server, and the server calculates an authentication result based on the signature received from the client and the template stored.

More specifically, the fuzzy signature includes:
(1.1) a key generation algorithm to be executed by a client at a time of registration;
(1.2) a signature algorithm executed by the client at a time of authentication; and
(1.3) a verification algorithm performed by the server at the time of authentication.

The following describes each algorithm.

(1.1) Key Generation Algorithm

Parameter κ and fuzzy data x are inputted to the key generation algorithm $\text{KeyGen}_{fs}$, which generates and outputs a public key (verification key) vk.

$$\text{KeyGen}_{fs}(1^\kappa, x) \to vk \tag{1}$$

(1.2) Signature Algorithm.

Fuzzy data x' and message m are inputted to the signature algorithm $\text{Sign}_{fs}$, which outputs a signature σ.

$$\text{Sign}_{fs}(x', m) \to \sigma \tag{2}$$

(1.3) Verification Algorithm

The verification key vk, message m, and signature σ are inputted to the verification algorithm $\text{Verify}_{fs}$, which outputs OK (good (OKAY)) or NG (no good) as a signature verification result.

$$\text{Verify}_{fs}(vk, m, \sigma) \to OK \text{ or } NG \tag{3}$$

With respect to
a domain X of fuzzy data;
a distance function d on X (d:X×X→R)(where R is a real number); and
a threshold θ, a signature verification will be OK, when a correctly constructed fuzzy signature scheme is used, and when verification is performed using a verification key vk generated by the key generation algorithm from the fuzzy data x∈X, on a signature a which is generated for a message m, using fuzzy data x'∈X that is close enough to fuzzy data x.

That is, regarding any message m and fuzzy data x and x' satisfying d (x, x')≤θ,
the following is assumed to hold.

$$\text{KeyGen}_{fs}(1^\kappa, x) \to vk \tag{4}$$

Assuming a result of executing the signature algorithm $\text{Sign}_{fs}$ as follows:

$$\text{Sign}_{fs}(x', m) \to \sigma \tag{5}$$

Then, as a result of the verification algorithm $\text{Verify}_{fs}$, the following holds.

$$\text{Verify}_{fs}(vk, m, \sigma) \to OK \tag{6}$$

The fuzzy signature is a signature scheme that uses fuzzy data extracted from an information source inclusive of fuzziness to give a signature and generate a key used to verify a signature. A typical example of fuzzy data is a biometric feature value, but the application of fuzzy signature is not limited to biometrics. Another example is password authentication that allows typos (misspelling, erroneous input, clerical error, and mis-conversion while typing). Fuzzy signature is also useful for an authentication that uses authentication information that normally does not allow for ambiguity, such as an integrated circuit (IC) card and a password, when the authentication information is exchanged via a communication channel including a noise.

An implementation method of fuzzy signature is disclosed, for example, in PTL (Patent literature) 1, PTL 2, NPL (Non-Patent Literature) 1, and NPL 2 and so forth.

In particular, NPL 2 discloses a general configuration method that combines a linear sketch and a digital signature having key linearity. Before explaining a general configuration method, linear sketch and digital signature having key linearity are explained.

Linear sketch is an algorithm including;
(2.1) keyed sketch algorithm; and
(2.2) key difference recovery algorithm.
The following describes each algorithm.

(2.1) Keyed Sketch Algorithm

Key k and fuzzy data x are inputted to a keyed sketch algorithm KeyedSketch, which outputs a sketch s.

$$\text{KeyedSketch}(k,x) \rightarrow s \tag{7}$$

(2.2) Key Difference Recovery Algorithm

Two sketches s and s' are inputted to a key difference recovery algorithm DiffRec, which outputs a value $\Delta k$.

$$\text{DiffRec}(s,s') \rightarrow \Delta k \tag{8}$$

With respect to a fuzzy data domain X; a distance function d on X ($d: X \times X \rightarrow R$); and a threshold $\theta$, a correctly constructed linear sketch scheme, when two sketches s and s' generated from two sufficiently close fuzzy data x, x'$\in$X are inputted to the key difference recovery algorithm DiffRec, outputs, as $\Delta k$, a difference between the two keys k and k' which are used to generate the two sketches s and s'.

That is, if $$d(x,x') \leq \theta \tag{9}$$

is satisfied, then with respect to $$\text{KeyedSketch}(k,x) \rightarrow s \tag{10}$$

and $$\text{KeyedSketch}(k',x') \rightarrow s' \tag{11}$$

the following holds.

$$\text{DiffRec}(s,s') \rightarrow \Delta k(=k-k') \tag{12}$$

Digital signature includes;
(3.1) key generation algorithm;
(3.2) signature algorithm; and
(3.3) verification algorithm.
The following describes each algorithm.

(3.1) Key Generation Algorithm

A security parameter $\kappa$ is inputted to a key generation algorithm $\text{KeyGen}_{ds}$, which generates and outputs a secret key (signature key) sk and a public key (verification key) vk.

$$\text{KeyGen}_{ds}(1^\kappa) \rightarrow (sk,vk) \tag{13}$$

(3.2) Signature Algorithm

A signature key sk and a message m are inputted to the signature algorithm $\text{Sign}_{ds}$, which outputs a signature $\sigma$.

$$\text{Sign}_{ds}(sk,m) \rightarrow \sigma \tag{14}$$

(3.3) Verification Algorithm

The verification key vk, message m, and signature $\sigma$ are inputted to the verification algorithm $\text{Verify}_{ds}$, which outputs OK or NG as a signature verification result.

$$\text{Verify}_{ds}(vk,m,\sigma) \rightarrow OK \text{ or } NG \tag{15}$$

In a case where a correctly constructed digital signature scheme is used, a signature $\sigma$ generated for a certain message m using a secret key sk generated by the key generation algorithm $\text{KeyGen}_{ds}$ when verified using a corresponding public key vk, results in OK.

That is, with respect to any m and $$\text{KeyGen}_{ds}(1^\kappa) \rightarrow (sk,vk) \tag{16}$$

letting an execution result of the signature algorithm as follows $$\text{Sign}_{ds}(sk,m) \rightarrow \sigma \tag{17},$$

the following holds.

$$\text{Verify}_{ds}(vk,m,\sigma) \rightarrow OK \tag{18}$$

Furthermore, in a case where a digital signature scheme has key linearity, there is a key difference verification algorithm MK that determines whether or not a difference $\Delta sk$ of the two private keys sk and sk' corresponding to two input public keys vk and vk', respectively, is equal to the other input value.

That is, with respect to $$\text{KeyGen}_{ds}(1^\kappa) \rightarrow (sk,vk) \tag{19}$$

and $$\text{KeyGen}_{ds}(1^\kappa) \rightarrow (sk',vk') \tag{20}$$

letting a difference between the two private keys sk and sk' corresponding to the two input public keys vk and vk', respectively, be $$\Delta sk = sk - sk' \tag{21}$$

the following holds.

$$MK(vk,vk',\Delta sk) \rightarrow OK \tag{22}$$

As a signature algorithm having the key linearity, Schnorr signature, Elgamal signature, DSA (Digital Signature Algorithm), ECDSA (Elliptic Curve Digital Signature Algorithm) and so forth are known. For example, in Schnorr, Elgamal, and DSA signatures, a positive integer less than p is randomly chosen as a secret key sk for a generator g of a group Gp whose rank is a prime number p, and a public key is defined as;

$$vk = g^{sk} \tag{23}$$

In this case, with respect to two key pairs (sk, $g^{sk}$) and (sk', $g^{sk'}$)

$$\Delta sk = sk - sk' \tag{24}$$

satisfies the following.

$$g^{sk}/g^{sk'} = g^{\Delta sk} \tag{25}$$

That is, MK (vk, vk', $\Delta sk$) outputs OK when $$vk/vk' = g^{\Delta sk} \tag{26}$$

That is, MK (vk, vk', $\Delta sk$) outputs OK, when a difference log(vk/vk') (log is a logarithmic function with g as a base) of the two secret keys sk and sk' corresponding to the public keys vk and vk', respectively, is equal to the other input value $\Delta sk$.

Using the linear sketch and the digital signature having key linearity described above, the fuzzy signature can be configured as follows.

(4.1) Key Generation Algorithm

A security parameter $\kappa$ and fuzzy data x are inputted to a key generation algorithm $\text{KeyGen}_{ds}$.

A secret key $sk_{ds}$ and a public key $vk_{ds}$ are calculated by entering the security parameter κ into the key generation algorithm $KeyGen_{ds}$ in the digital signature scheme.

$$KeyGen_{ds}(1^\kappa) \to (sk_{ds}, vk_{ds}) \quad (27)$$

Next, a sketch s is computed by entering a secret key $sk_{ds}$ and fuzzy data x to KeyedSketch, a keyed sketch algorithm of a linear sketch method.

$$KeyedSketch(sk_{ds}, x) \to s \quad (28)$$

Next, a verification key $vk_{fs}$, which is a combination of a public key $vk_{ds}$ and a sketch s, is outputted.

$$vk_{fs} = (s, vk_{ds}) \quad (29)$$

This $vk_{fs}$ is the public key (verification key) vk in Expression (1) above.

(4.2) Signature Algorithm

Fuzzy data x' and message m are inputted to the signature algorithm $Sign_{fs}$.

A private key $sk'_{ds}$ and public key $vk'_{ds}$ are calculated by entering the security parameter κ into the key generation algorithm $KeyGen_{ds}$ in the digital signature scheme.

$$KeyGen_{ds}(1^\kappa) \to (sk'_{ds}, vk'_{ds}) \quad (30)$$

Next, a secret key $sk'_{ds}$ and fuzzy data x' are inputted to KeyedSketch, a keyed sketch algorithm of the linear sketch scheme, to compute a sketch s'.

$$KeyedSketch(sk'_{ds}, x') \to s' \quad (31)$$

Next, a signature $\sigma_{ds}$ is computed by entering the secret key $sk'_{ds}$ and the message m into the signature algorithm $Sign_{ds}$, a digital signature scheme.

$$Sign_{ds}(sk'_{ds}, m) \to \sigma_{ds} \quad (32)$$

Next, a signature $\sigma_{fs}$ is outputted by combining the public key $vk'_{ds}$, the sketch s' and the signature $\sigma_{ds}$.

$$\sigma_{fs} = (vk'_{ds}, s', \sigma_{ds}) \quad (33)$$

This $\sigma_{fs}$ is the signature σ in Expression (2).

(4.3) Verification Algorithm:

The public key $vk_{ds}$, message m and signature σ are inputted to the verification algorithm $Verify_{fs}$ (Expression (3)).

Next, the public key $vk'_{ds}$, message m, and signature $\sigma_{ds}$ are inputted to the verification algorithm $Verify_{ds}$, a digital signature scheme, and it is confirmed that OK is output.

$$Verify_{ds}(vk'_{ds}, m, \sigma_{ds}) \to OK \quad (34)$$

Next, the sketch s and sketch s' are inputted to DiffRec, a linear sketch-based key difference recovery algorithm, to obtain the key difference $\Delta sk_{ds}$.

$$DiffRec(s, s') \to \Delta sk_{ds} \quad (35)$$

Next, it is verified that the key difference verification algorithm MK outputs OK for the public keys $vk_{ds}$ and $vk'_{ds}$, and the key difference $\Delta sk_{ds}$.

$$MK(vk_{ds}, vk'_{ds}, \Delta sk_{ds}) \to OK \quad (36)$$

When both Expression (34) and Expression (36) above are confirmed OK, OK is outputted (corresponding to OK in Expression (3)), and when any one of Expression (34) and Expression (36) above is NG, NG (corresponding to NG in Expression (3)) is output.

NPL 1 and NPL 2 disclose how to configure a linear sketch. It is also disclosed that a fuzzy signature can be constructed by combining the disclosed linear sketch with a digital signature scheme having key linearity, such as Schnorr signature or the like. Both schemes are schemes for the following parameters.

Domain of fuzzy data: $X = [0, 1)^n$ (n-dimensional vector with each component consisting of real numbers being not less than 0 and less than 1, where $[0, 1) = \{x | 0 \leq x < 1\}$ is a left-closed and right-open range).

Distance function d on X: L∞ distance (Chebyshev distance: the maximum absolute value of difference between each coordinate of two points is a distance between the two points). That is, for n-dimensional vectors $x = (x_1, \ldots, x_n)$ and $x' = (x'_1, \ldots, x'_n)$, the distance function d is given by $$d((x_1, \ldots, x_n), (x'_1, \ldots, x'_n)) = \max |(x_i - x'_i)| \ (i = 1, \ldots, n) \quad (37)$$

Threshold θ: A real number being not less than 0 and less than 1, where 1/(2θ) is an integer.

However, many features extracted from fingerprints, irises, or the like cannot be matched using L∞ distance, and deal with the following parameters, for example.

Domain of fuzzy data $X = \{0, 1\}^n$ (i.e., n-dimensional vector with each component consisting of 0 or 1)

Distance function d on X: Hamming distance (L1 distance). A distance function d is given by $$d((x_1, \ldots, x_n), (x'_1, \ldots, x'_n)) = \text{sum} |(x_i - x'_i)| \ (i = 1, \ldots, n) \quad (38)$$

Threshold θ: An integer of not less than 0 and not more than n

That is, the feature value for such a parameter cannot be used as it is in the fuzzy signature scheme disclosed in NPL 1 and NPL 2.

In PTL 3, there is disclosed that in the technology of NPL 1 and NPL 2, processing of determining whether or not two biometric data are sufficiently similar corresponds to implementing by threshold processing for "L ∞ distance" between features extracted from the biometric. Further, there is disclosed a problem that in many biometric schemes such as fingerprint, vein, face, iris, the distance between features is defined by Hamming distance (L1 distance) or the like and thus the fuzzy signature based on the above technique cannot be realized. To address this problem, PTL 3 discloses a method (invention) that realizes the fuzzy signature using various types of features by transforming features on an Lp distance space for any p to vectors on an L∞ distance space. The method disclosed in PTL 3 can be used, for example, to convert features for determining similarity based on an L1 distance to features for determining similarity based on an L∞ distance.

[PTL 1] Japanese Patent No. 5707311
[PTL 2] Japanese Patent No. 6096893
[PTL 3] Japanese Patent No. 6216567
[NPL 1] TAKAHASHI, Kenta, MATSUDA, Takahiro, MURAKAMI, Takao, HANAOKA, Goichiro, NISHIGAKI, Masakatsu. A Signature Scheme with a Fuzzy Private Key. Malkin, Tal and Kolesnikov, Vladimir and Lewko, Allison Bishop and Polychronakis, Michalis. Springer International Publishing, 2015, 105-126. (Lecture Notes in Computer Science). (9092). http://dx.doi.org/10.1007/978-3-319-28166-7_6. ISBN: 978-3-319-28166-7.
[NPL 2] MATSUDA, Takahiro, TAKAHASHI, Kenta, MURAKAMI, Takao, HANAOKA, Goichiro. Fuzzy Signatures: Relaxing Requirements and a New Construction. Manulis, Mark and Sadeghi, Ahmad-Reza and Schneider, Steve. Springer International Publishing, 2016, 97-116. (Lecture Notes in Computer Science). (9696). http://dx.doi.org/10.1007/978-3-319-39555-5_6. ISBN: 978-3-319-39555-5.

SUMMARY

An analysis of related technologies is presented below.

As described above, it is not possible to directly apply the methods of related technologies such as the above NPL 1 and NPL 2 to data such as biometric feature values where distance between feature values, such as fingerprints and irises, is defined by a Hamming distance (L1 distance).

Although it is possible to combine a technique disclosed in PTL 3 or the like with techniques of related technologies such as PTL 1 and PTL 2, the technique disclosed in PTL 3 is asymptotic transformation, which generates a large error when a dimension (n) of a vector is large. That is, an accuracy in biometric authentication is reduced.

Therefore, it is desired to construct a linear sketch scheme based on a Hamming distance to determine similarity for data such as biometric feature values extracted from a fuzzy data source, without recourse to the transformation technique disclosed in PTL 3 or the like.

Therefore, it is a main object of the present invention to provide a linear sketch system, a generation apparatus, a reconstruction apparatus, an authentication method, and a program and a recording medium, each enabling to judge similarity of data such as a biometric feature extracted from a fuzzy data source based on a Hamming distance.

According to an aspect of a present invention, there is provided a linear sketch system including a generation apparatus and a reconstruction apparatus.

The generation apparatus includes: a key input part that receives a key; a fuzzy data input part that receives fuzzy data; a key conversion part that converts the key to an encoded key by using an encoding function of an error correcting code; and a sketch generation part that generates a sketch by applying a first composite transformation on the fuzzy data and the encoded key.

The reconstruction apparatus includes: a sketch input part that receives a first sketch generated based on a first key and first fuzzy data, and a second sketch generated based on a second key and second fuzzy data; a sketch composition part that generates a composite sketch by applying a second composite transformation on the first sketch and the second sketch; and a key-difference reconstruction part that calculates, based on the composite sketch, a difference between the first key and the second key used respectively for generating the first sketch and the second sketch.

According to an aspect of the present invention, there is provided a generation apparatus including a key input part that receives a key; a fuzzy data input part that receives fuzzy data; a key conversion part that converts the key to an encoded key by using an encoding function of an error correcting code; and a sketch generation part that generates a sketch by applying a first composite transformation on the fuzzy data and the encoded key.

According to an aspect of the present invention, there is provided a reconstruction apparatus including: a sketch input part that receives, from a generation apparatus, a first sketch generated based on a first key and first fuzzy data, and a second sketch generated based on a second key and second fuzzy data, wherein the generation apparatus converts a received key to an encoded key by using an encoding function of an error correcting code and generates a sketch by applying a first composite transformation on fuzzy data and the encoded key; a sketch composition part that generates a composite sketch by applying a second composite transformation on the first sketch and the second sketch; and a key-difference reconstruction part that calculates, based on the composite sketch, a difference between the first key and the second key used respectively for generating the first sketch and the second sketch.

According to an aspect of the present invention, there is provided an authentication method including:

on a sketch generation side, converting a received key to an encoded key by using an encoding function of an error correcting code; and
generating a sketch by applying a first composite transformation on fuzzy data and the encoded key; and
on a reconstruction side, receiving a first sketch generated based on a first key and first fuzzy data and a second sketch generated based on a second key and second fuzzy data;
generating a composite sketch by applying a second composite transformation on the first sketch and the second sketch, and
calculating a difference between the first key and the second key used respectively for generating the first sketch and the second sketch based on the composite sketch.

According to an aspect of the present invention, there is provided a program causing a computer to perform processing including:

receiving a key;
receiving fuzzy data;
transforming the key to an encoded key by using an encoding function of an error correcting code; and
generating a sketch by applying a first composite transformation on the fuzzy data and the encoded key.

According to an aspect of the present invention, there is provided a program to cause the computer to perform processing including:

a program causing a computer to perform processing comprising:
receiving a first sketch generated based on a first key and first fuzzy data from a generation apparatus that transforms a received key to an encoded key by using an encoding function of an error correcting code and generates a sketch by applying a first composite transformation on received fuzzy data and the encoded key;
receiving a second sketch generated based on a second key and second fuzzy data from the generation apparatus;
generating a composite sketch by applying a second composite transformation on the first sketch and the second sketch; and
calculating a difference between the first key and the second key used respectively for generating the first sketch and the second sketch based on the composite sketch.

According to the present invention, a computer readable storage medium (such as RAM (Random Access Memory), ROM (Read Only Memory), or EEPROM (Electrically Erasable and Programmable ROM (Electrically Erasable and Programmable ROM), or a non-transitory computer readable recording medium such as HDD (Hard Disk Drive), CD (Compact Disc), or DVD (Digital Versatile Disc). (non-transitory computer readable recording medium)) are provided.

According to the present invention, it is possible to realize a linear sketch system that makes similarity judgment about data such as a biometric feature extracted from a fuzzy data source based on a Hamming distance.

DETAILED DESCRIPTION

Figure 1:
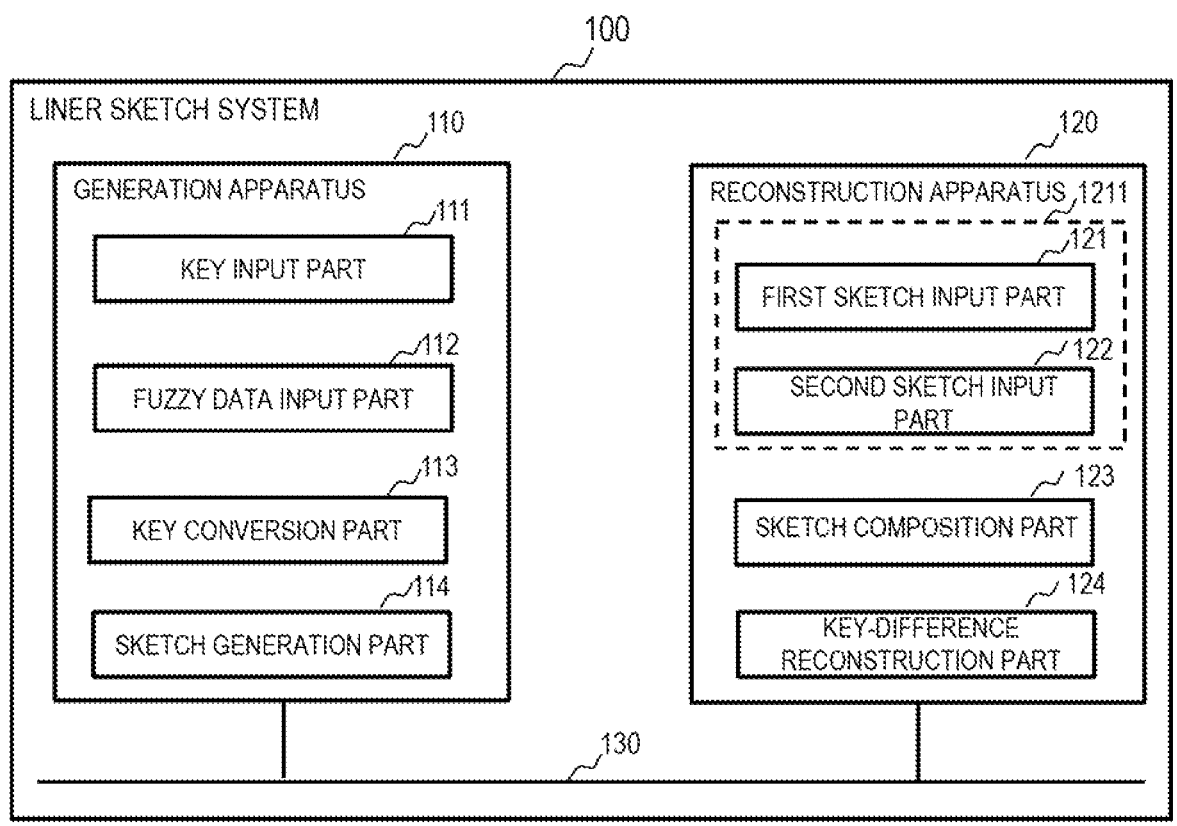
FIG. 1 is a diagram schematically illustrating an example of a linear sketch system according to a first example embodiment of the present invention.

An example embodiment of the present invention will be described in detail with reference to drawings. In each drawing and in each example embodiment described in the description, the same sign is given to similar components and the explanation thereof is omitted as appropriate.

A linear sketch system of the present invention has a generation apparatus that generates a sketch by composing an encoded key, which is obtained by encoding the key by error correction codes, and fuzzy data, and a reconstruction apparatus that outputs a result of a linear transformation of two keys by decoding two sketches composited by error correction codes when two fuzzy data are sufficiently close to each other.

In each of the following example embodiments, as a not limiting example, linear sketch system implementations for following parameters will be described.

Domain X of fuzzy data=n-dimensional vector where each component is an integer

Distance function d on X: L1 distance (Hamming distance)

$$d((x_1, \ldots, x_n),(x'_1, \ldots, x'_n))=\text{(Number of index } i \text{ where } x_i \neq x'_i \text{ among } i=1, \ldots, n) \quad (39)$$

Threshold θ: An integer not less than 0 and not more than n.

Even if it is not fuzzy data for the above parameters, there may be a case where it is possible to convert them to fuzzy data for the above parameters.

For example, an n-dimensional vector where each component is a real number can be converted to fuzzy data contained in this domain by rounding each elements after multiplying with a constant number.

In each of the following embodiments, an error correcting code with linearity (referred to as "a linear code" in the following) are used as a configuration element. First, a linear code will be described.

Error correcting code includes:

(5.1) Encoding algorithm; and (5.2) Decoding algorithm.

Each algorithm is outlined below.

(5.1) Encoding Algorithm:

When a message m is inputted to an encoding algorithm Encode, it generates and outputs a code word c.

$$\text{Encode}(m) \to c \quad (40)$$

(5.2) Decoding Algorithm

When the code word c is inputted to a decoding algorithm Decode, message m is output.

$$\text{Decode}(c) \to m \quad (41)$$

In an error-correcting code scheme in which the message m consists of M blocks, the code word c consists of C blocks (M<C), and D blocks are allowed to be erroneous, provided that correctly constructed, with respect to the code word c which is generated by the encoding algorithm Encode from the message m, the original message m can be reconstructed when any code word c', for which the number of blocks among the C blocks that are different from the code word c is D (D<C) blocks or less, is inputted to the decoding algorithm Decode.

That is, for any message m of M blocks assume;

$$\text{Encode}(m) \to c \quad (42)$$

Then, for any code word c' for which the number of blocks different from code word c is D blocks or less, the following holds.

$$\text{Decode}(c') \to m \quad (43)$$

Furthermore, in a case of an error-correcting code capable of allowing erasure correction, if the total number of errors and erasure blocks is D blocks or less, the code can be correctly decoded.

Using the linear code, it is possible to calculate a code word corresponding to a result of a linear operation for each block of those messages from two code words. That is, for example, for $$\text{Encode}(m) \to c \text{ and } \text{Encode}(m') \to c' \quad (44)$$

letting a block-wise sum of code word c and code word c' be denoted as $$\Delta c = c + c' \quad (45)$$

then a block-wise sum of message m and message m' is obtained as a result of decoding Δc.

$$\text{Decode}(\Delta c) = m + m' \quad (46)$$

A linear code can be configured to make the first M blocks of a code word composed of C blocks, as a message itself. Such a configuration scheme is specifically called as "systematic code".

In a linear code where each block is B bits, a message is an M-dimensional vector with each element being B bits or less, a code word is a C-dimensional vector with each element being B bits or less, and operations c+c' and m+m' described above are performed with a modulo $2^B$.

In a linear code where each block is B bits, a message m is recovered by a reconstruction algorithm from a series of C blocks for which the number of different blocks is D or less, by comparing with C block code word c generated by a coding algorithm from the of message m of M blocks.

Therefore, in a linear code where each block is one bit, the operations c+c' and m+m' described above become an exclusive OR (Exclusive OR: XOR, i.e., 0+0=1+1=0, 0+1=1+0=1).

In an error correcting code, where each block is one bit, a message m is reconstructed by the reconstruction algorithm from c', for which the number of different bits is D bits or less, compared with a C-bit code word c generated by the coding algorithm from M-bit message m. That is, the message m is reconstructed by the reconstruction algorithm from c' whose Hamming distance from c is D or less. That is, the message m is reconstructed by the reconstruction algorithm from c' whose Hamming distance from c is D or less.

As a linear code, BCH (Bose-Chaudhuri-Hocquenghem code) code, Reed-Solomon code, and LDPC (Low-Density Parity-Check code) code and so forth are known. Reed-Solomon code and LDPC code allows erasure correction.

By using the linear sketch system of the present invention in the configuration of a fuzzy signature scheme, it is possible to handle data such as a biometric feature for which similarity judgment is performed based on a Hamming distance, to achieve a fuzzy signature without loss of accuracy. The following is a more detailed description based on several example embodiments.

First Example Embodiment

In the present example embodiment, fuzzy data is data such as a biometric (biometric) feature or the like extracted from a fuzzy source and is assumed to be an n-dimensional vector for which each element has a value of 0 or 1.

In the present example embodiment, it is desirable to use a linear code for the following parameters.
Number of blocks in a message: M=length of a received key,
Number of blocks contained in a code word: C=n,
Number of error blocks allowed: D=θ (a threshold value of a biometric feature value),
Bit length of each block: B=1

FIG. 1 schematically illustrates an example of a configuration of a linear sketch system 100. The linear sketch system 100 includes a generation apparatus 110 and a reconstruction apparatus 120.

The generation apparatus 110 comprises a key input part 111, a fuzzy data input part 112, a key conversion part 113, and a sketch generation part 114. The reconstruction apparatus 120 includes a first sketch input part 121, a second sketch input part 122, a sketch composition part 123, and a key-difference reconstruction part. The generation apparatus 110 and the reconstruction apparatus 120 may each include a computer that includes a processor that executes instructions stored in a memory and an input/output interface, such as a network interface, so that the processor executes a program to implement processing of each part of the apparatus. The generation apparatus 110 and the reconstruction apparatus 120 are mutually communicatively connected via a network 130 (wired LAN (Local Area Network) or wireless LAN, or WAN (Wide Area Network), or mobile communication network, etc.). It is noted that the generation apparatus 110 and the reconstruction apparatus 120 may be implemented in the same apparatus and communicatively connected.

Figure 2A:
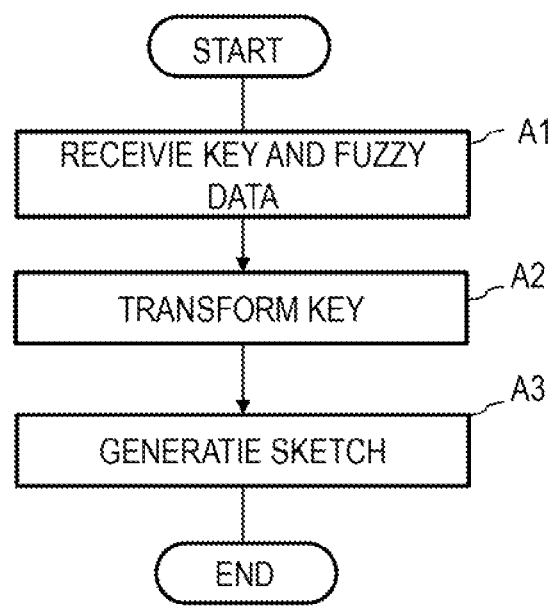
FIG. 2A is a flow chart illustrating an operation of a generation apparatus of a linear sketch system according to the first example embodiment of the present invention.

FIG. 2A is a flow chart illustrating an operation of a generation apparatus 110 of a linear sketch system 100 according to the present example embodiment.

The generation apparatus 110 receives a received key k (M bits) from the key input part 111 and a received fuzzy data x from the fuzzy data input part 112 (Step A1). The key input part 111 receives, for example, the key $vk_{fs}$ of the above Expression (29). The generation apparatus 110 may receive the key $vk_{fs}$ from an apparatus (not shown) that executes the key generation algorithm of (4.1) above. The fuzzy data input part 112 may be used to receive a feature value such as biometric data or the like obtained from a sensor (not shown) as fuzzy data x.

A key conversion part 113 of the generation apparatus 110 executes an error correcting code encoding algorithm (Encode) with the key k received from the key input part 111 as input and obtains an encoded key c (C bits) as an execution result (Step A2).

$$\text{Encode}(k) \rightarrow c \tag{47}$$

Next, a sketch generation part 114 of the generation apparatus 110 calculates bit-wise exclusive logical OR (bit-wise xor) of the fuzzy data x (C bits) received from the fuzzy data input part 112 in step A1 and the encoded key c obtained in step A2, and outputs it as a sketch s (Step A3).

$$s = x \text{ xor } c. \tag{48}$$

Figure 8A:
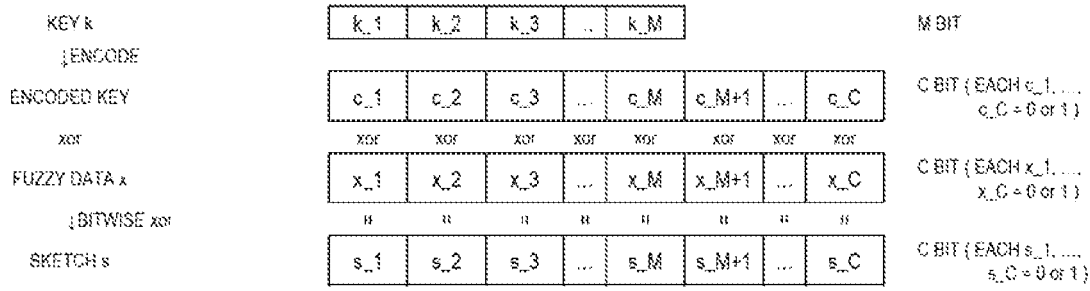
FIGS. 8A through 8E illustrate computations of first through fifth example embodiments of generation apparatus of the present invention.

FIG. 8A illustrates an example of bit operation sequences for generation of the sketch s in the above described generation apparatus 110.

Figure 2B:
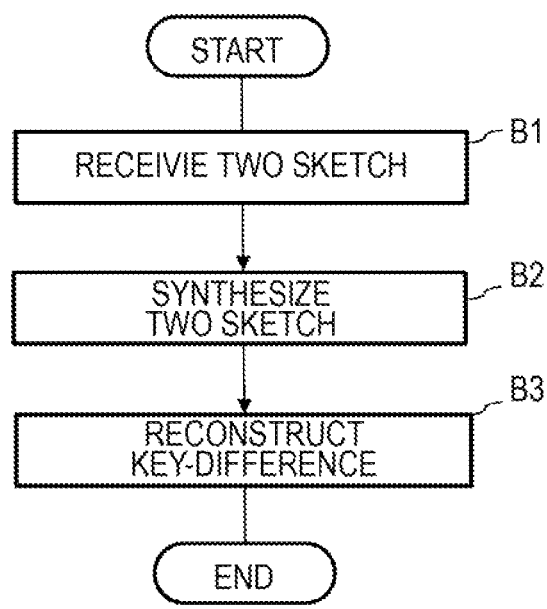
FIG. 2B is a flow chart illustrating an operation of a reconstruction apparatus of a linear sketch system according to the first example embodiment of the present invention.

FIG. 2B is a flowchart illustrating an operation of the reconstruction apparatus 120 of the linear sketch system 100 according to the present example embodiment.

A first sketch input part 121 of the reconstruction apparatus 120 receives an input first sketch s, and a second sketch input part 122 receives an input second sketch s' (step B1). Although the first sketch input part 121 and the second sketch input part 122 are illustrated as separate units in FIG. 1, they may be configured in a single sketch input part 1211, and the first sketch s and the second sketch s' may be received by the sketch input part 1211.

Next, the sketch composition part 123 of the reconstruction apparatus 120 calculates bitwise exclusive logical OR of the first sketch s and the second sketch s' received in step B1 to obtain a composited sketch t (step B2).

$$t = s \text{ xor } s' \tag{49}$$

Next, the key-difference reconstruction part 124 of the reconstruction apparatus 120 supplies the composite sketch t calculated in step B2 to the error correcting code decoding algorithm Decode, causes to execute the algorithm Decode, and output a decoded result Δ (step B3).

$$\text{Decode}(t) \rightarrow \Delta \tag{50}$$

The following confirms that the linear sketch system according to the present example embodiment works correctly.

Let s be a first sketch generated by the generation apparatus 110 from the key k (first key) and fuzzy data x (first fuzzy data).

$$s = x \text{ xor } \text{Encode}(k) \tag{51}$$

Let s' be a second sketch generated by the generation apparatus 110 from the key k' (second key) and the fuzzy data x' (second fuzzy data).

$$s' = x' \text{ xor } \text{Encode}(k') \tag{52}$$

The generation apparatus 110 enters the generated first and second sketches s and s' as the first and second sketches, respectively, into the reconstruction apparatus 120 via a communication means such as a network 130, for example.

The sketch composition part 123 of the reconstruction apparatus 120 (step B2) performs the following calculation:

$$t = s \text{ xor } s' \tag{53}$$
$$= (x \text{ xor Encode }(k)) \text{ xor } (x' \text{ xor Encode }(k'))$$
$$= (x \text{ xor } x') \text{ xor Encode }(k) \text{ xor Encode }(k')$$

Since a linear code is used, where each block is one bit, Expression (53) can be expressed as $$t=(x \text{ xor } x')\text{xor Encode}(k \text{ xor } k') \tag{54}$$

Furthermore, if a hamming distance between x and x' is less than or equal to an error correction capability D of the linear code, then the Hamming distance between Encode (k xor k') and t is also less than or equal to D.

The reason is that the following holds $$\text{Encode }(k \text{ xor } k') \text{ xor } t = \tag{55}$$
$$\text{Encode }(k \text{ xor } k') \text{ xor } ((x \text{ xor } x') \text{ xor Encode }(k \text{ xor } k')) =$$
$$(x \text{ xor } x') \text{ xor}$$

and a Hamming distance between Encode (k xor k') and t is equal to a Hamming distance between x and x'.

Therefore, k xor k' is reconstructed by executing the reconstruction algorithm Decode (t) for t, a Hamming distance between t and the code word Encode (k xor k') of k xor k' is equal to or less than D. That is, a result Δ of Decode(t) is k xor k'.

$$\text{Decode}((x \text{ xor } x')\text{xor Encode}(k \text{ xor } k'))\rightarrow k \text{ xor } k' \tag{56}$$

That is, in step B3 of FIG. 2B, it can be confirmed that a difference between the first key k and the second key k': k-k', is calculated correctly.

According to the above described present example embodiment, by error correcting and decoding a composite sketch, which is a bitwise exclusive OR of first and second sketches, each of which is a bitwise exclusive OR of an encoded key and fuzzy data, a difference between the keys calculated by bitwise exclusive OR can be calculated.

Second Example Embodiment

In the present example embodiment, it is preferred to use a linear code for following parameters.

Number of blocks in a message: M
Number of blocks in a code word: C=n (length of a biometric feature value)
Number of error blocks permitted: D=θ (a threshold of a biometric feature value)
Length of bit in each block: B=length of a key to be inputted.

Figure 3:
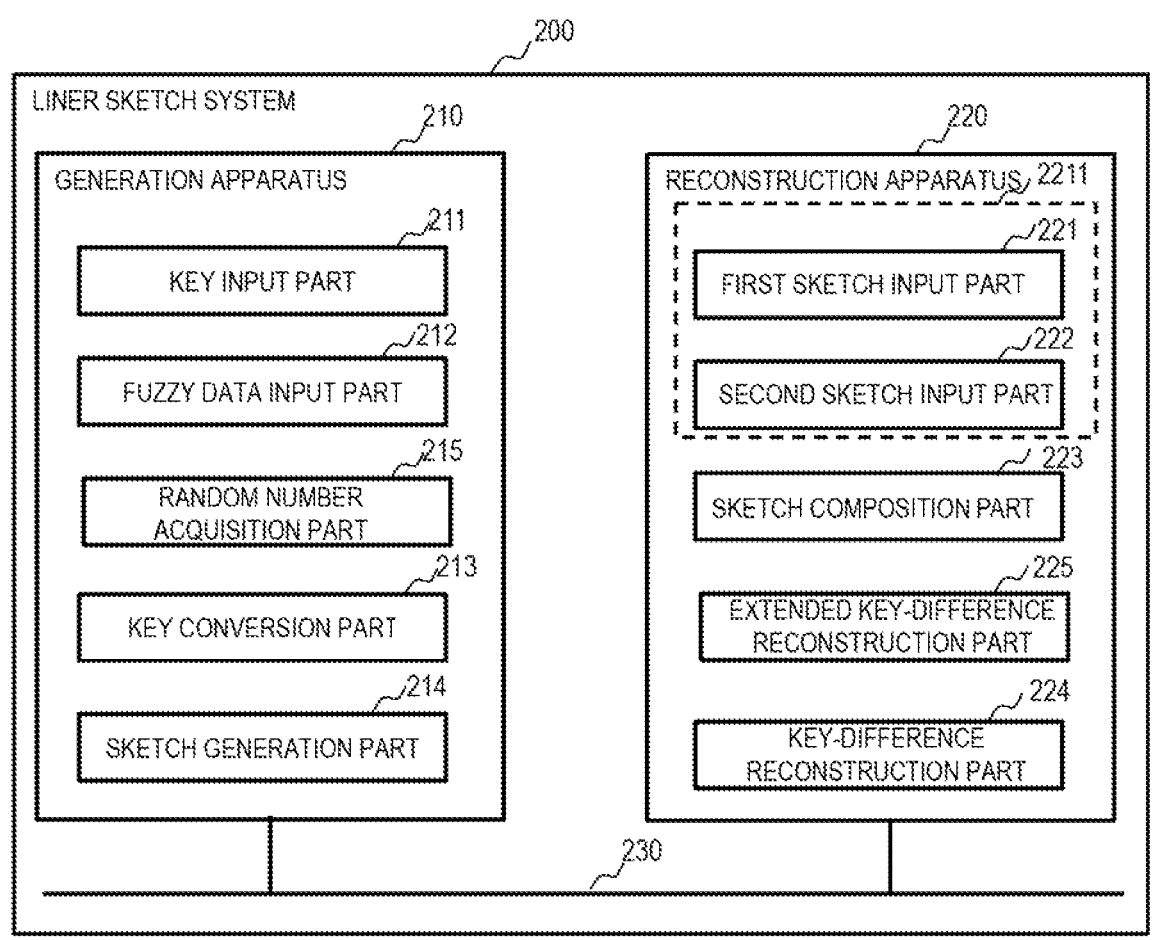
FIG. 3 is a diagram schematically illustrating an example of a linear sketch system according to second and third example embodiments of the present invention.

FIG. 3 schematically illustrates an example of a configuration of a linear sketch system 200 according to a second example embodiment. The linear sketch system 200 includes a generation apparatus 210 and a reconstruction apparatus 220.

The generation apparatus 210 includes a key input part 211, a fuzzy data input part 212, a random number acquisition part 215, a key conversion part 213, and a sketch generation part 214. The reconstruction apparatus 220 includes a first sketch input part 221, a second sketch input part 222, a sketch composition part 223, an extended key-difference reconstruction part 225, and a key-difference reconstruction part 224. The generation apparatus 210 and the reconstruction apparatus 220 may each include a computer including a processor that executes instructions stored in a memory and an input/output interface, such as a network interface, so that the processor executes a program to implement processing of each part of the apparatus. The generation apparatus 210 and the reconstruction apparatus 220 are mutually communicatively connected via a network 230 (wired LAN (Local Area Network) or wireless LAN, WAN (Wide Area Network), mobile communication network, etc.). It is noted that the generation apparatus 210 and the reconstruction apparatus 220 may be implemented in the same apparatus and communicatively connected.

Figure 4A:
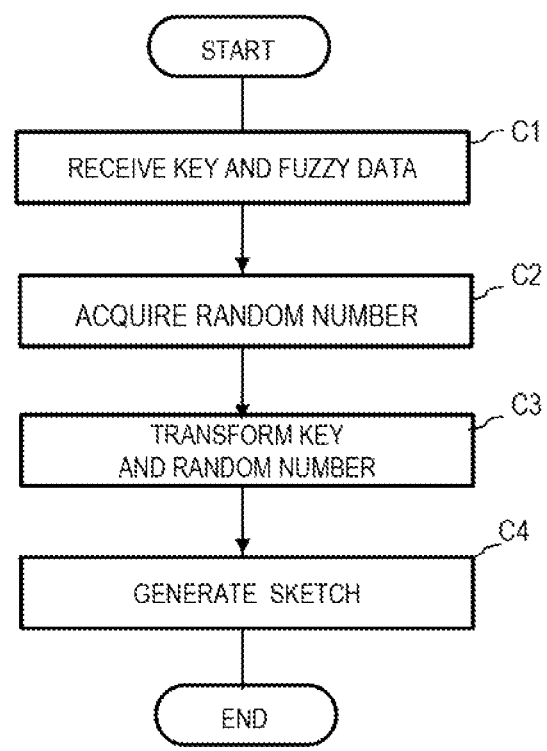
FIG. 4A is a flow chart illustrating an operation of a generation apparatus of a linear sketch system according to the second and third example embodiment of the present invention.

FIG. 4A is a flowchart illustrating an operation of a generation apparatus 210 of a linear sketch system 200 according to the present example embodiment.

A key input part 211 of the generation apparatus 210 receives a received key k (B bit), and a fuzzy data input part 212 receives received fuzzy data x (Step C1).

Next, a random number acquisition part 215 of the generation apparatus 210 acquires M−1 random numbers whose length is greater than or equal to a size of the key (e.g., B bits) (Step C2). In the present example embodiment, any method can be used as a method of acquiring random numbers. For example, random numbers may be generated internally in the generation apparatus 210, or random numbers may be generated outside the generation apparatus 210 and entered into the generation apparatus 210. The generated random numbers can be expressed as $$r_2, \ldots, r_M \tag{57}$$

Next, a key conversion part 213 of the generation apparatus 210 lines up the key k received in step C1 and the M−1 random numbers $r_2, \ldots, r_M$ obtained in step C2 (e.g., k, $r_2, \ldots, r_M$), and generates an M-block series (B×M bits) consisting of the key k and the M−1 random numbers $r_i$ (i=2, . . . , M).

Then, the key conversion part 213 enters a series of M blocks (B×M bits) into the error correcting code encoding algorithm (Encode) and executes the algorithm (Encode) to obtain, as a result, an encoded key c consisting of C blocks (Step C3).

$$\text{Encode}(k, r_2, \ldots, r_M) \rightarrow c = (c_1, \ldots, c_C) \tag{58}$$

It is noted that the order of the k and M−1 random numbers is not limited to the above and may be arranged in any order.

Next, a sketch generation part 214 of the generation apparatus 210 calculates a block-by-block (block-wise) addition result (or subtraction result) of the C-bit fuzzy data x received in step C1, where each component consists of 0 or 1, and the encoded key c obtained in step C3:

$$x+c=(x_1+c_1, \ldots, x_C+c_C) \tag{59}$$

and output the result as a sketch s (C block(s), B×C bits) (Step C4).

Figure 8B:
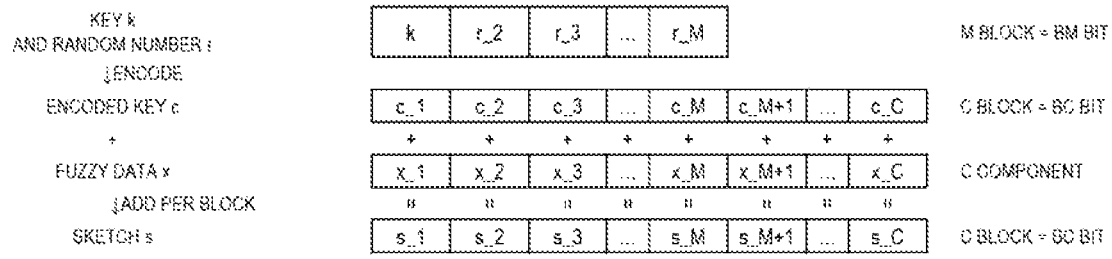

FIG. 8B illustrates examples of the computation (block-by-block computation) of sketch s generation in the generation apparatus 210 described above. The generation apparatus 210 generates a first sketch $s=(s_1, \ldots, s_C)$ and a second sketch $s'=(s'_1, \ldots, s'_C)$.

Figure 4B:
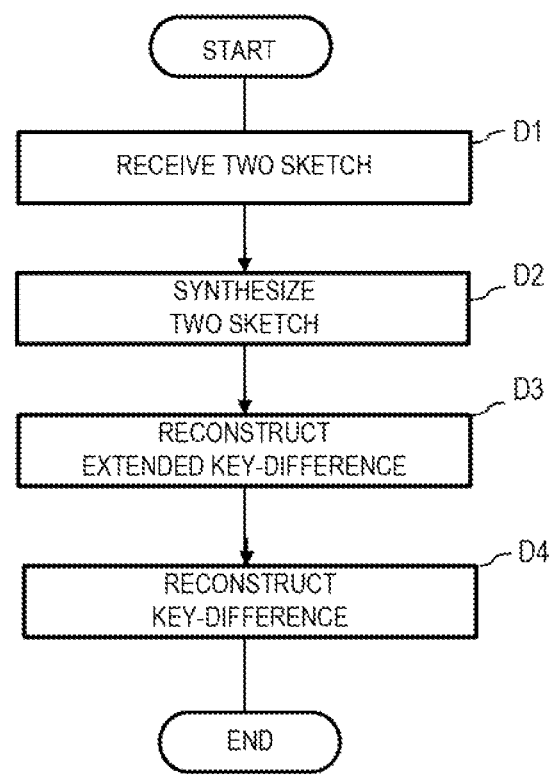
FIG. 4B is a flow chart illustrating an operation of a reconstruction apparatus of a linear sketch system according to the second and third example embodiment of the present invention.

FIG. 4B is a flowchart illustrating an operation of the reconstruction apparatus 220 of the linear sketch system 200 according to the present example embodiment.

A first sketch input part 221 of the reconstruction apparatus 220 receives a first sketch $s=(s_1, \ldots, s_C)$ supplied from the generation apparatus 210, and a second sketch input part 222 receives a second sketch $s'=(s'_1, \ldots, s'_C)$ supplied from the generation apparatus 210 (Step D1). Although the first sketch input part 221 and the second sketch input part 222 are illustrated as separate units in FIG. 3, they may be configured in a single sketch input part 2211, and the first sketch s and the second sketch s' may be received by the sketch input part 2211.

Next, the sketch composition part 223 of the reconstruction apparatus 220 calculates a subtraction (or addition) result for each component of the first sketch $s=(s_1, \ldots, s_C)$ and the second sketch $s'=(s'_1, \ldots, s'_C)$ received in step D1, to obtain a composited sketch t (Step D2).

$$t=(s_1-s'_1, \ldots, s_C-s'_C) \quad (60)$$

Next, the extended key-difference reconstruction part 225 of the reconstruction apparatus 220 enters the value t calculated in step D2 into the decoding algorithm (Decode) of the error correcting code and executes the algorithm (Decode) to obtain:

$$\text{Decode}(t) \to (\Delta_1, \ldots, \Delta_M) \quad (61)$$

(Step D3).

Next, a key-difference reconstruction part 224 of the reconstruction apparatus 220 outputs the first component $\Delta_1$ of the value calculated in step D3 (step D4). It is noted that if the key k is placed in the i-th block (i is any one of i=2, ..., or C) in step C3, the i-th component $\Delta_i$ is output.

The above operation confirms that the linear sketch system of the second example embodiment works correctly.

Let s be the sketch generated from the key k and fuzzy data x by the generation apparatus 210. That is, the sketch s can be expressed by the following expression:

$$s=(x_1, \ldots, x_C)+\text{Encode}(k, r_2, \ldots, r_M) \quad (62)$$

Let s' be the sketch generated from the key k' and fuzzy data x' by the generation apparatus 210. That is, s' can be expressed by the following expression.

$$s'=(x'_1, \ldots, x'_C)+\text{Encode}(k', r'_2, \ldots, r'_M) \quad (63)$$

When entering s and s' into the reconstruction apparatus 220, as the first and second sketches, respectively, the following expression is calculated in step D2

$$\begin{aligned}
t &= (x_1, \ldots, x_C) - (x'_1, \ldots, x'_C) + \\
&\quad \text{Encode}(k, r_2, \ldots, r_M) - \text{Encode}(k', r'_2, \ldots, r'_M) \\
&= \text{Encode}(k, r_2, \ldots, r_M) - \text{Encode}(k', r'_2, \ldots, r'_M) + \\
&\quad \text{Encode}(k, r_2, \ldots, r_M) - \text{Encode}(k', r'_2, \ldots, r'_M)
\end{aligned} \quad (64)$$

Since the linear code are used, Expression (64) can be expressed as, $$t = (x_1 - x'_1, \ldots, x_C - x'_C) + \text{Encode}(k-k', r_2-r'_2, \ldots, r_M-r'_M) \quad (65)$$

Furthermore, if a Hamming distance between x and x' is less than or equal to the error correction capability D of the linear code, then $(x_1-x'_1, \ldots, x_C-x'_C)$ is a vector consisting of zeros of C-D or more and ones of D or less.

Therefore, the number of blocks that are different from Encode(k-k', $r_2-r'_2$, ..., $r_M-r'_M$) and t is less than or equal to D.

Accordingly, a result of Decode(t) in step D3 is $$(\Delta_1, \ldots, \Delta_M)=(k-k', r_2-r'_2, \ldots, r_M-r'_M) \quad (66)$$

That is, it can be confirmed that the difference between two keys k and k': k-k', is correctly calculated in step D4.

According to the present example embodiment, since encoded key and fuzzy data are composited by block-by-block addition or subtraction, the reconstruction apparatus can correctly calculate a difference between the keys calculated by subtraction.

Third Example Embodiment

In a third example embodiment of this invention, it is preferred to use a linear systematic code capable of allowing erasure correction for following parameters.

Number of blocks in a message: M.
Number of blocks in a code word: C=n+1 (length of a biometric feature value)
Number of error blocks allowed: D=θ+1 (a threshold of a biometric feature value)
Length of bit in each block: B=length of a key entered A configuration of a linear sketch system according to the third example embodiment is equal to the configuration of a linear sketch system 200 (FIG. 3) according to the second example embodiment and is therefore not described.

Next, an operation of each apparatus in this system will be described in detail.

An operation of the generation apparatus 210 of the linear sketch system 200 differs only in step C4 from the operation of the linear sketch system of the second example embodiment described with reference to FIG. 4A. It is noted that because of use of systematic code, the first half M blocks of the encoded key $c=(c_1, \ldots, c_C)$, calculated in step C3 of FIG. 4A by:

$$\text{Encode}(k, r2, \ldots, rM) \to c \quad (67)$$

respectively, satisfy the following:

$$c_1=k, c_2=r_2, \ldots, c_M=r_M \quad (68)$$

In the present example embodiment, step C4 in FIG. 4A operates as follows.

A sketch generation part 214 of the generation apparatus 210 generates n=C-1 bits of fuzzy data, where each component consists of 0 or 1, received in step C1

$$x=(x_1, \ldots, x_{C-1})$$

and the second and subsequent blocks ($c_2, \ldots, c_C$) of the encoded key obtained in step C3, and calculate a block-wise sum of $$(x_1+c_2, \ldots, x_{C-1}+c_C) \quad (69)$$

to output as sketch s ((C-1) block=B×(C-1) bits) (Step C4).

Figure 8C:
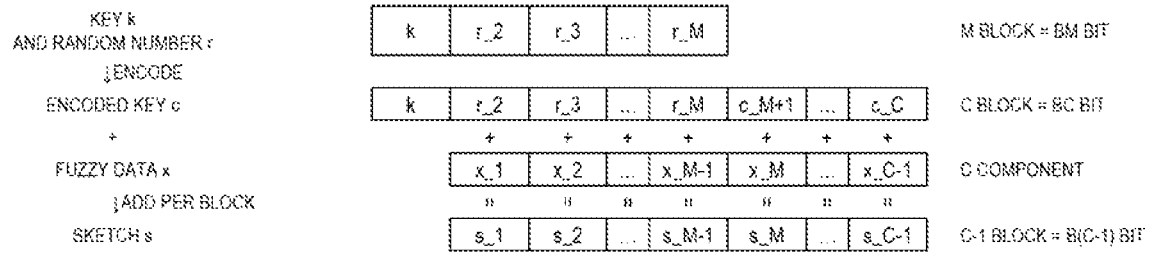

FIG. 8C is a diagram illustrating an example of calculation of the generation of sketch s in the generation apparatus 210 described above. The generation apparatus 210 generates the first sketch $s=(s_1, \ldots, s_{C-1})$ and the second sketch $s'=(s'_1, \ldots, s'_{C-1})$.

The operation of the reconstruction apparatus 220 of the linear sketch system 200 according to the present example embodiment differs only in step D2 from the operation of the reconstruction apparatus 220 of the linear sketch system of the second example embodiment described with reference to FIG. 4B.

In the present example embodiment, step D2 operates as follows.

A sketch composition part 223 of the reconstruction apparatus 220 calculates a component-wise difference between the first sketch $$s = (s_1, \ldots, s_{C-1})$$

received in step D1 and the second sketch $$s' = (s'_1, \ldots, s'_{C-1})$$

to obtain a composited sketch (Step D2).

$$t = (s_1 - s'_1, \ldots, s_{C-1} - s'_{C-1}) \qquad (70)$$

It is evident that this operation allows the linear sketch system according to the present example embodiment to work correctly, since the linear sketch system of the second example embodiment works correctly.

This is because the sketch in the linear sketch system according to the present example embodiment is defined as that in which one block is lost from the sketch in the linear sketch system according to the second example embodiment above.

Furthermore, the error correcting code used by the linear sketch system according to the present example embodiment allows erasure correction, because the number of acceptable error blocks is one block more than the number of acceptable error blocks in the error correcting code used by the linear sketch system according to the second example embodiment.

According to the present example embodiment, in addition to an effect of the linear sketch system according to the second example embodiment, the effect is that it is possible to prevent leakage of a key from a sketch more securely. The reason for this is that in step C4 of FIG. 4A, a portion of an encoded key that contains the key itself is not output as a sketch.

Fourth Example Embodiment

A fourth example embodiment of the present invention is obtained by adding an additional configuration and a corresponding operation to the second example embodiment.

Figure 5:
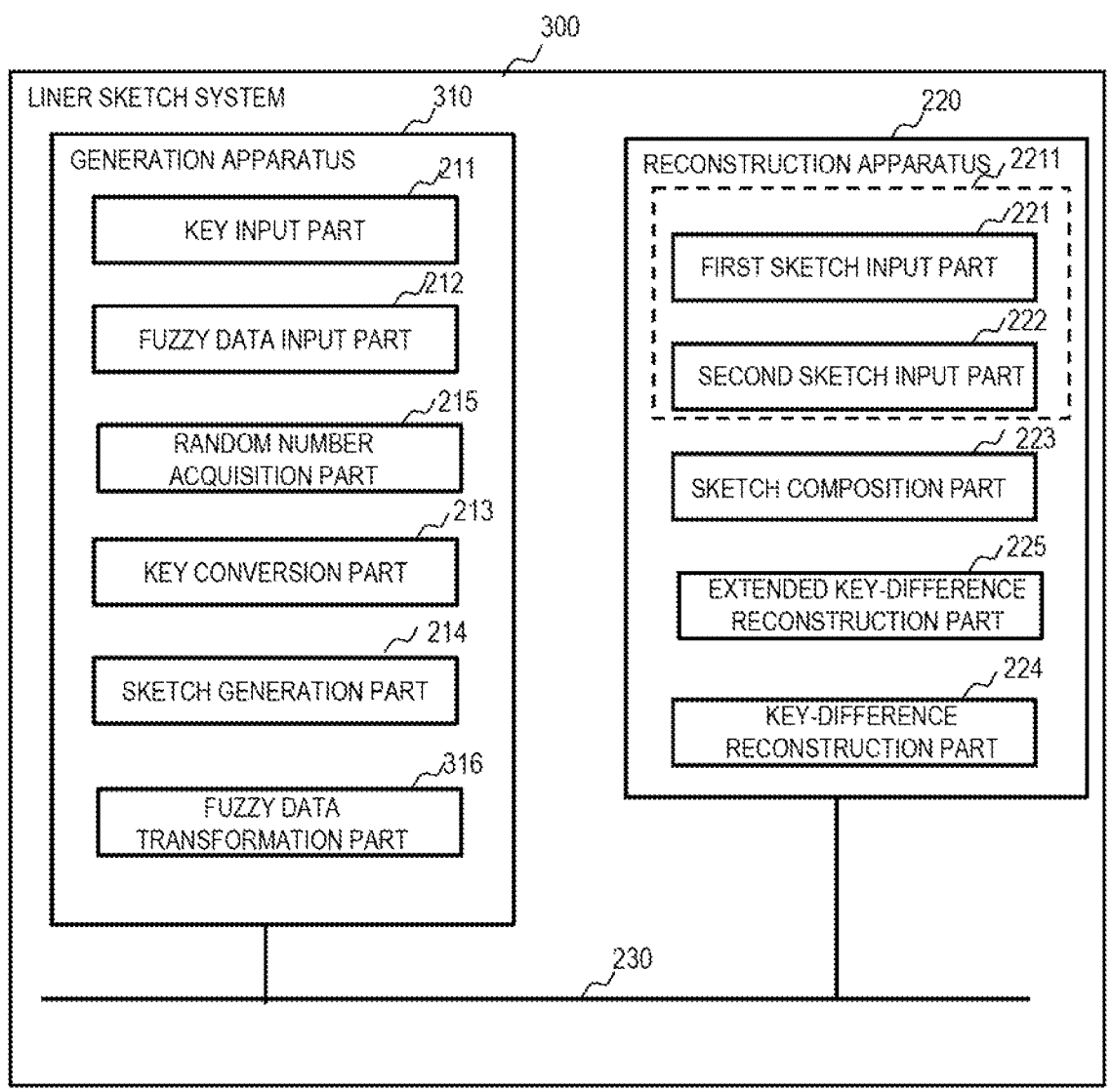
FIG. 5 is a diagram schematically illustrating an example of a linear sketch system according to a fourth example embodiment of the present invention.

FIG. 5 schematically illustrates an example configuration of the linear sketch system 300 for the present example embodiment. The linear sketch system 300 of the present example embodiment includes a generation apparatus 310 and a reconstruction apparatus 220.

The generation apparatus 310 includes a fuzzy data transformation part 316 added to the configuration of the above described second example embodiment. That is, the generation apparatus 310 includes a key input part 211, a fuzzy data input part 212, a key conversion part 213, a sketch generation part 214, a random number acquisition part 215, and a fuzzy data transformation part 316. In the generation apparatus 310, the key input part 211, the fuzzy data input part 212, the key conversion part 213, the sketch generation part 214, and the random number acquisition part 215 are the same as those described in the second example embodiment above, respectively. The reconstruction apparatus 220 includes a first sketch input part 221, a second sketch input part 222, a sketch composition part 223, an extended key-difference reconstruction part 225, and a key-difference reconstruction part 224. These are the same as those described in the second example embodiment above.

Figure 6:
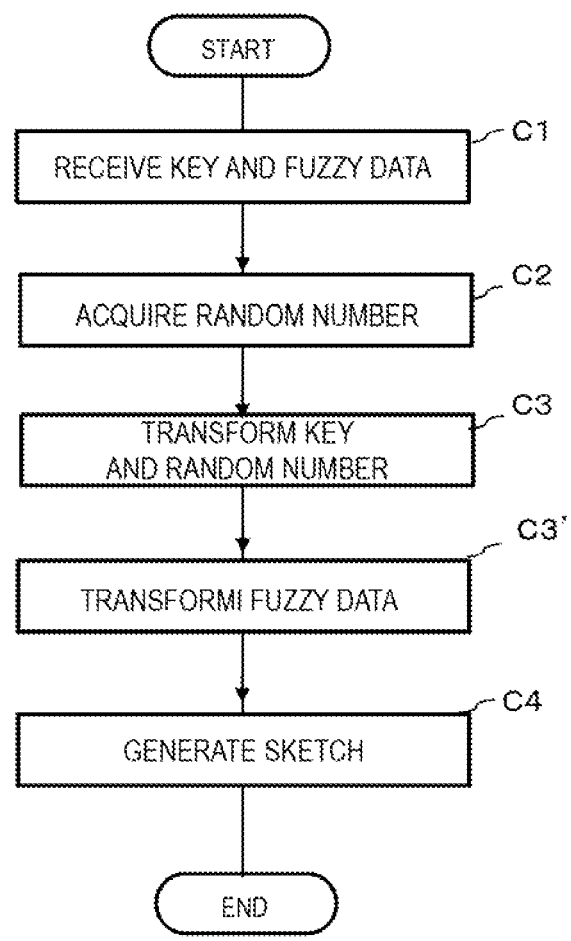
FIG. 6 is a flow chart illustrating an operation of a generation apparatus of a linear sketch system according to the fourth example embodiment of the present invention.

FIG. 6 is a flowchart illustrating an operation of a generation apparatus 310 of a linear sketch system 300 according to the present example embodiment. The generation apparatus 310 of the linear sketch system 300 of the present example embodiment performs the following step C3' before step C4 in the operation according to the linear sketch system 200 of the second example embodiment and the third example embodiment.

The fuzzy data transformation part 316 of the generation apparatus 310 transforms each bit of the fuzzy data $x = (x_1, \ldots, x_C)$ received in step C1 by a hash function h, etc., respectively, to obtain the following (Step C3').

$$z = (h(1, x_1), \ldots, h(C, x_C)) \qquad (71)$$

It is noted that a transformation method using a hash function, or the like is not limited to this method. For example, it may be simply expressed as:

$$h_x = (h(x_1), \ldots, h(x_c)) \qquad (72).$$

Also, for example, it may be expressed using a key kh that is stored separately, as follows:

$$hx = (h(k_h, 1, x_1), \ldots, h(k_h, c, x_c)) \qquad (73).$$

Figure 8D:
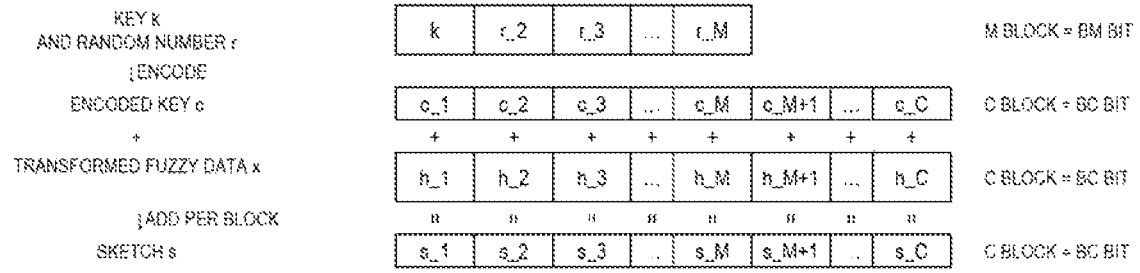

FIG. 8D illustrates an example of computation of sketch generation of the generation apparatus 310.

It is evident that the linear sketch system in the present example embodiment works correctly by this operation, because the linear sketch system in the second and third example embodiments works correctly. This is because sketches in the linear sketch system according to the second and third example embodiments differ only in that the fuzzy data used to configure the sketches in the linear sketch system according to the second and third example embodiments are transformed by a deterministic function and because the number of different bits in the two fuzzy data coincides with the number of different blocks in the two transformed fuzzy data.

The above described present example embodiment has an effect that leakage of key and fuzzy data from a sketch can be more robustly prevented. The reason for this resides is that fuzzy data is extended by a hash function in step C3' of FIG. 6, and the extended fuzzy data is composited with the code word of the key in step C4.

Fifth Example Embodiment

A fifth example embodiment of present invention is similar to the above described fourth example embodiment, but with an additional configuration and corresponding operation to the above described third example embodiment. In the fifth example embodiment of the present invention, it is preferred to use a linear systematic code that also allows erasure correction for following parameters.

Number of blocks in a message: M;
Number of blocks in a code word: C=n+1 (length of a biometric feature value);
Number of error blocks allowed: D=θ+1 (a threshold of a biometric feature values); and
Bit length of each block: B=length of a key entered The configuration of a linear sketch system according to the fifth example embodiment is equivalent to the linear sketch system 300 (FIG. 5) according to the fourth example embodiment described hereinabove, and thus explanation is omitted.

Next, an operation of each apparatus in the fifth example embodiment will be described.

The operation of generation apparatus 310 of the linear sketch system 300 according to the present example embodiment are the same as in step C4 of the linear sketch system according to the fourth example embodiment described with reference to FIG. 4A. In step C3 of FIG. 4A, the first half M blocks of the encoded key $c = (c_1, \ldots, c_C)$, respectively, computed by $$\text{Encode}(k, r_2, \ldots, r_M) \to c \quad (74)$$

satisfy the following conditions.

$$c_1 = k, c_2 = r_2, \ldots, c_M = r_M \quad (75)$$

A sketch generation part 214 of generation apparatus 310 calculates a block-wise sum of a hash value of n=C−1 bits of fuzzy data, where each component consists of 0 or 1, received in step C1 of FIG. 4A $$z = (h\_1, \ldots, h\_C-1) = ((h1, x_1), \ldots, h(C-1, x_{C-1}))$$

and the second and subsequent blocks $(c_2, \ldots, c_C)$ of encoded key obtained in step C3, where the block-wise sum is given as $$(h\_1 + c_2, \ldots, h\_C-1 + c_{C-1}) \quad (76)$$

and outputs the sum as sketch s ((C−1) block=B×(C−1) bits) (Step C4).

Figure 8E:
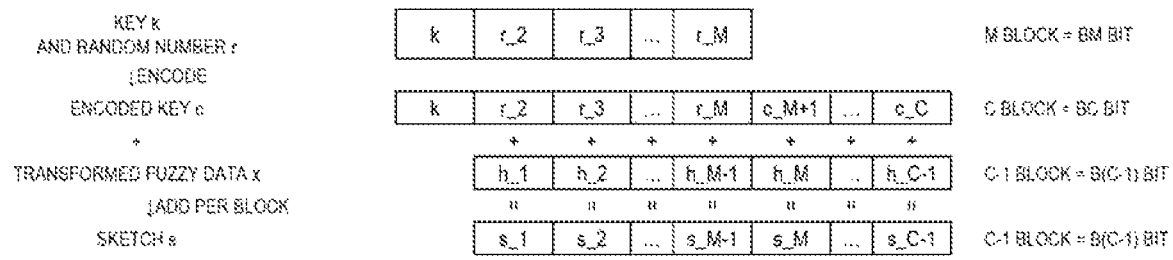

The generator 310 generates the first sketch $s = (s_1, \ldots, s_{C-1})$ and the second sketch $s' = (s'_1, \ldots, s'_{C-1})$. FIG. 8E illustrates an example of computation of the generation of sketch s in the generation apparatus 310 described above.

An operation of the reconstruction apparatus 220 of the linear sketch system 300 according to the present example embodiment differ in processing of the sketch composition part 223 from the operation of the reconstruction apparatus 220 of the linear sketch system according to the fourth example embodiment described with reference to FIG. 5.

In the present example embodiment, a sketch composition part 223 of the reconstruction apparatus 220 calculates difference between the first sketch $s = (s_1, \ldots, s_{C-1})$ and
the second sketch $s' = (s'_1, \ldots, s'_{C-1})$
for each component, to obtain a composite sketch $$t = (s_1 - s'_1, \ldots, s_{C-1} - s'_{C-1}) \quad (77)$$

It is evident that the linear sketch system according to the present example embodiment works correctly, because this operation allows the linear sketch system according to the third and fourth example embodiments work correctly.

Figure 7:
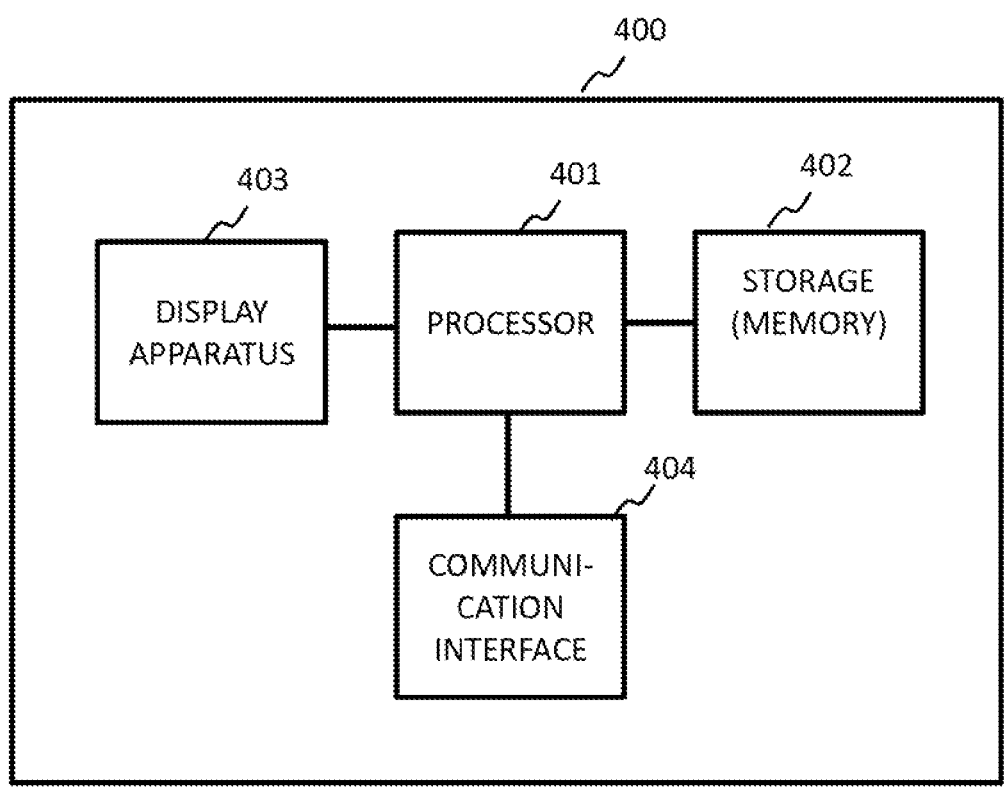
FIG. 7 is a diagram illustrating an example of a configuration of an example embodiment of the present invention.

FIG. 7 illustrates an example in which the generation apparatus 110, 210 and 310, or the reconstruction apparatus 120 and 220 of each example embodiment of the present invention is implemented in a computer 400. The computer 400 includes a processor 401, a storage (memory) 402 including a semiconductor storage such as RAM, ROM, EEPROM, etc., or HDD, etc., a display 403, and a communication interface 404. The communication interface 404 connects to the networks 130 and 230 of FIGS. 1, 3, and 5. A program including instructions executable by the processor 401 and data is stored in the storage (memory) 402, and the processor 401 fetches an instruction from the storage (memory) 402 and executes the instruction to operate as the generation apparatus 110, 210 or 310, and reconstruction apparatus 120 or 220 of the above first through fifth example embodiments. By implementing a virtualization mechanism such as a hypervisor in the computer 400, the generation apparatus 110, 210 and 310, and the reconstruction apparatus 120 and 220 may be made to operate as a virtual machine (Virtual Machine).

The linear sketch system according to each example embodiment of the present invention can be used as a component element of a fuzzy signature. In particular, since the linear sketch system according to each example embodiment of the present invention handles fuzzy data that is matched based on a Hamming distance, it can be utilized for a fuzzy signature using a biometric feature value, matching of which is carried out based on a Hamming distance.

The disclosures in the above PTLs 1-3 and NPLs 1 and 2 are incorporated herein by reference thereto. Variations and adjustments of the example embodiments and examples are possible within the bounds of the entire disclosure (including the claims) of the present invention and based on the basic technical concept of the present invention. Various combinations and selections of various disclosed elements (including elements in the claims, example embodiments, examples, drawings, etc.) are possible within the bounds of the claims the present invention. Namely, the present invention, as a matter of course, includes various variations and modifications that could be made by those skilled in the art according to the entire disclosure including the claims and the technical concept.

REFERENCE SIGNS LIST 100,200,300 linear sketch system
110,210,310 generation apparatus
111,211 key input part
112,212 fuzzy data input part
113,213 key conversion part
114,214 sketch generation part
120,220 reconstruction apparatus
121,221 first sketch input part
122,222 second sketch input part
123,223 sketch composition part
124,224 key-difference reconstruction part
130,230 network
215 random number acquisition part
225 extended key-difference reconstruction part
316 fuzzy data transformation part
400 computer
401 processor
402 storage (memory)
403 display
404 communication interface (input/output interface)
1211,2211 sketch input part

What is claimed is:

1. An authentication method performed by a generation apparatus and a restoration apparatus that each include a processor and a memory storing instructions executable by the processor, the authentication method comprising:

a sketch generation process that uses parameters for a linear code, including M that is a number of blocks in a message, C that is a number of blocks in a code word, B that is a block length and is equal to a length of a received key, and D that is a number of permitted error blocks, the sketch generation process including:

acquiring M−1 random numbers;

converting a series of M blocks including the received key and the M−1 random numbers to an encoded key of C blocks by using an encoding function of an error correcting code; and generating a sketch of C blocks by applying a block-wise addition or subtraction operation, as a first synthetic transformation, on fuzzy data of C bits and the encoded key of the C blocks, and a restoration process including:

receiving, from the sketch generation process, a first sketch generated based on a first encoded key and first fuzzy data and a second sketch generated based on a second encoded key and second fuzzy data;

generating a synthesized sketch by applying a second synthetic transformation on the first sketch and the second sketch; and calculating a difference between the first encoded key and the second encoded key based on the synthesized sketch.

2. The authentication method according to claim 1, wherein the second synthetic transformation is a block-wise subtraction or addition operation performed on the first sketch and the second sketch to obtain the synthesized sketch of C blocks, the restoration process further includes calculating an extended key-difference of M blocks, by decoding the synthesized sketch using a decoding function of the error correcting code, and the difference between the first encoded key and the second encoded key is calculated based on the extended key-difference of M blocks.

3. The authentication method according to claim 1, wherein the sketch generation process further includes:

transforming each bit of the fuzzy data of C bits by a hash function.

4. A linear sketch system comprising:

a generation apparatus; and a restoration apparatus, wherein the generation apparatus comprises a first processor and a first memory storing first program instructions executable by the first processor to perform a sketch generation process that uses parameters for a linear code, including M that is a number of blocks in a message, C that is a number of blocks in a code word, B that is a block length and is equal to a length of a received key, and D that is a number of permitted error blocks, the sketch generation process including:

acquiring M−1 random numbers;

converting a series of M blocks including the received key and the M−1 random numbers to an encoded key of C blocks by using an encoding function of an error correcting code; and generating a sketch of C blocks by applying a block-wise addition or subtraction operation, as a first synthetic transformation, on fuzzy data of C bits and the encoded key of the C blocks, wherein the restoration apparatus comprises a second processor and a second memory storing second program instructions executable by the second processor to perform a restoration process including:

receiving, from the sketch generation process, a first sketch generated based on a first encoded key and first fuzzy data and a second sketch generated based on a second encoded key and second fuzzy data;

generating a synthesized sketch by applying a second synthetic transformation on the first sketch and the second sketch; and calculating a difference between the first encoded key and the second encoded key based on the synthesized sketch.

5. The linear sketch system according to claim 4, wherein the second synthetic transformation is a block-wise subtraction or addition operation performed on the first sketch and the second sketch to obtain the synthesized sketch of C blocks, the restoration process further includes calculating an extended key-difference of M blocks, by decoding the synthesized sketch using a decoding function of the error correcting code, and the difference between the first encoded key and the second encoded key is calculated based on the extended key-difference of M blocks.

6. The linear sketch system according to claim 4, wherein the number of error blocks permitted D is set to a predetermined value +1, wherein the sketch generation process further includes:

generating an encoded key of C−1 blocks by excluding one block including the received key from the encoded key of C blocks; and generating a sketch of C−1 blocks by applying the applies block-wise addition or subtraction operation, as the first synthetic transformation, on fuzzy data of C−1 bits and the encoded key of C−1 blocks.

7. The linear sketch system according to claim 4, wherein the sketch generation process further includes:

transforming each bit of the fuzzy data of C bits by a hash function.

8. The linear sketch system according to claim 7, wherein the number of error blocks permitted D is set to a predetermined value +1, wherein the sketch generation process further includes:

generating an encoded key of C−1 blocks by excluding one block including the received key from the encoded key of C blocks; and generating a sketch of C−1 blocks by applying the block-wise addition or subtraction operation, as the first synthetic transformation, on fuzzy data of C−1 bits and the encoded key of C−1 blocks.

9. A generation apparatus comprising:

a first processor;

a first memory storing first program instructions executable by the first processor to perform a sketch generation process that uses parameters for a linear code, including M that is a number of blocks in a message, C that is a number of blocks in a code word, B that is a block length and is equal to a length of a received key, and D that is a number of permitted error blocks, the sketch generation process including:

acquiring M−1 random numbers;

converting a series of M blocks including the received key and the M−1 random numbers to an encoded key of C blocks by using an encoding function of an error correcting code; and generating a sketch of C blocks by applying a block-wise addition or subtraction operation, as a first synthetic transformation, on fuzzy data of C bits and the encoded key of the C blocks.

10. The generation apparatus according to claim 9, wherein the number of error blocks permitted D is set to a predetermined value +1, wherein the sketch generation process further includes:

generating an encoded key of C−1 blocks by excluding one block including the received key from the encoded key of C blocks; and generating a sketch of C−1 blocks by applying the block-wise addition or subtraction operation, as the first synthetic transformation, on fuzzy data of C−1 bits and the encoded key of C−1 blocks.

11. The generation apparatus according to claim 9, wherein the sketch generation process further includes:

transforming each bit of the fuzzy data of C bits by a hash function.

12. The generation apparatus according to claim 11, wherein the number of error blocks permitted is set to a predetermined value +1, wherein the sketch generation process further includes:
generating an encoded key of C−1 blocks by excluding one block including the received key from the encoded key of C blocks; and
generating a sketch of C−1 blocks by applying the block-wise addition or subtraction operation, as the first synthetic transformation, on fuzzy data of C−1 bits and the encoded key of C−1 blocks.

13. The generation apparatus according to claim 9, wherein
the second synthetic transformation is a block-wise subtraction or addition operation performed on the first sketch and the second sketch to obtain the synthesized sketch of C blocks,
the restoration process further includes calculating an extended key-difference of M blocks, by decoding the synthesized sketch using a decoding function of the error correcting code, and
the difference between the first encoded key and the second encoded key is calculated based on the extended key-difference of M blocks.

14. A restoration apparatus comprising:
a processor; and
a memory storing program instructions executable by the processor to perform a restoration process including:
receiving, from a sketch generation process, a first sketch generated based on a first encoded key and first fuzzy data and a second sketch generated based on a second encoded key and second fuzzy data;
generating a synthesized sketch by applying a second synthetic transformation on the first sketch and the second sketch; and
calculating a difference between the first encoded key and the second encoded key based on the synthesized sketch,
wherein the sketch generation process uses parameters for a linear code, including M that is a number of blocks in a message, C that is a number of blocks in a code word, B that is a block length and is equal to a length of a received key, and D that is a number of permitted error blocks, the sketch generation process including:
acquiring M−1 random numbers;
converting a series of M blocks including the received key and the M−1 random numbers to an encoded key of C blocks by using an encoding function of an error correcting code; and
generating a sketch of C blocks by applying a block-wise addition or subtraction operation, as a first synthetic transformation, on fuzzy data of C bits and the encoded key of the C blocks.

15. The restoration apparatus of claim 14, wherein
the second synthetic transformation is a block-wise subtraction or addition operation performed on the first sketch and the second sketch to obtain the synthesized sketch of C blocks,
the restoration process further includes calculating an extended key-difference of M blocks, by decoding the synthesized sketch using a decoding function of the error correcting code, and
the difference between the first encoded key and the second encoded key is calculated based on the extended key-difference of M blocks.

16. The restoration apparatus of claim 14, wherein the sketch generation process further includes:
transforming each bit of the fuzzy data of C bits by a hash function.

* * * * *